(12) United States Patent  (10) Patent No.: US 6,734,870 B1
Kuo  (45) Date of Patent: May 11, 2004

(54) LINE SCAN-CONVERSION METHOD

(75) Inventor: D. David Kuo, Santa Clara, CA (US)

(73) Assignee: Cardio Logic, Inc., San Carlos, CA (US)

( * ) Notice: Subject to any disclaimer, the term of this patent is extended or adjusted under 35 U.S.C. 154(b) by 0 days.

(21) Appl. No.: 09/342,442

(22) Filed: Jun. 29, 1999

(51) Int. Cl.[7] .............................................. G09G 5/00
(52) U.S. Cl. ...................................... 345/611; 345/613
(58) Field of Search ............................. 345/430, 441, 345/506, 421, 418, 611, 613, 619

(56) References Cited

U.S. PATENT DOCUMENTS 5,479,590 A  * 12/1995  Lin ............................. 345/611

OTHER PUBLICATIONS

Foley et al., "Computer Graphics: Principles and Practice" 2$^{nd}$ edition in C, 1996, pp. 664, 693.*
Foley, J.D., et al., Computer Graphics, 2d ed., 1996, Addison–Wesley, pp. 72–81, 884.

* cited by examiner

Primary Examiner—Matthew Luu
(74) Attorney, Agent, or Firm—Robert Buckley

(57) ABSTRACT

An integer arithmetic graphic line scan-conversion procedure sub-divides a pixel grid into a 1/N sub-pixel grid, where N is a positive integer selected to provide a desired precision. A line segment is defined by a pair of vertices relative to the sub-pixel grid. The vertices are ordered such that the line segment is in one of the first and the second quadrants, depending upon the slope of the line segment. An integer estimate is made of the slope of the line segment relative to the sub-pixel grid. The scan progresses along a major axis at pixel intervals, while best-fit integer projections of the line segment are made along an orthogonal axis relative to the sub-pixel grid. A resulting array of integer line-scan points relative to the sub-pixel grid are used to adjust color and brightness attributes of display pixels, and the resulting adjusted pixels are output to a display device to create an image of the scanned line segment. In a preferred embodiment, N is a positive power of 2. In other embodiments, the method is used for general linear interpolation in any graphic subsystem, such as in the processes of drawing polygons, shading and morphing.

6 Claims, 3 Drawing Sheets

LINE SCAN-CONVERSION METHOD

FIELD OF THE INVENTION

The invention relates generally to information processing systems, and more specifically to an improved method for scan-converting a line for use with a graphical output in an information processing system.

BACKGROUND OF THE INVENTION

A scan-conversion procedure for lines computes the coordinates of the pixels that lie on or near an ideal, thin straight line imposed on a two-dimensional grid (Foley, J. D. et al, Computer Graphics, 2d ed., 1996, Addison-Wesley, pp. 72–81).

The simplest procedure for the scan-conversion of a line computes the slope of the line and predicts the y-intercepts of the ideal line as the x-coordinate is repeatedly incremented by 1. A pixel is then intensified nearest the predicted y-intercept at the equally spaced x-increments.

The drawbacks of this simple procedure are that it involves floating point arithmetic and rounding and floor functions. Bresenham (Bresenham, J. E., "Algorithm for Computer Control of a Digital Plotter," IBM Systems Journal, 4(1), 1965, pp. 25–30) developed an algorithm that uses only integer arithmetic. Bresenham showed that his procedure provides a best-fit approximation to an ideal line by minimizing the error to the line. A floating point version of the Bresenham procedure can be applied to lines having arbitrary real-valued endpoint coordinates (Foley, supra, at p. 75).

Current graphical outputs in information processing systems demand the use of floating point arithmetic including multiply and divide operations to obtain needed accuracy. What is needed is a line scan-conversion procedure for application to lines having arbitrary real-valued endpoint coordinates in which floating point arithmetic is not required and in which many integer multiply and divide operations can be implemented using simple, fast left and right shift operations.

SUMMARY OF THE INVENTION

The present invention meets those needs, and others that will become apparent below, by providing a procedure for scan-converting a line, with an arbitrary precision, using integer arithmetic only. The procedure subdivides an integer grid into a new grid in which each original grid element is subdivided by a predetermined positive integer in both an X-direction and a Y-direction, where X and Y are orthogonal, rectangular coordinates. The original grid is referred to as an integer 'coarse' grid, while the subdivided grid is referred to as an integer 'fine' grid. A line having arbitrary real-valued endpoint coordinates is defined in the fine grid system by providing a pair of integer vertices defining the opposite ends of the line. When the coarse grid granularity approximately equals an output pixel size, and when the fine grid granularity is approximately one-sixteenth that of the coarse grid, the method is able to accurately scan-convert lines having arbitrary real-valued endpoint coordinates without apparent loss of resolution.

Though the same result can be obtained using floating point arithmetic, the present invention uses only integer arithmetic and therefore does not need access to a floating point arithmetic unit. The Bresenham method (supra) can be implemented using only integer arithmetic, but it does not allow for arbitrary precision and is considered to be too slow for advanced graphic applications. The present procedure, on the other hand, is fast enough, and precise enough to meet the needs of the most demanding graphic display requirements.

The line scan-conversion procedure continues by ordering the two line-defining vertices such that the vertex having the larger integer Y-coordinate is referred to as the 'large' vertex, while the other vertex is the 'small' vertex. The ordering will place the line into one of the first or the second quadrant depending on whether the slope of the line is negative or positive, respectively.

Having ordered the two vertices, the procedure will determine an integer approximation to a slope for an ideal line connecting the two vertices. The procedure will then increment in the Y-direction by one coarse grid unit and determine a best-fit X-coordinate in the fine grid system. The result will be a series of points defined relative to the fine grid and having Y-coordinates that coincide with coarse grid coordinates. The use of the fine grid coordinates in the X-direction produces the same results that can be obtained using floating point arithmetic while using [only] integer arithmetic only.

The results of the line scan-conversion procedure are used to adjust color and brightness attributes of display pixels. The resulting adjusted display pixels are output to a display device for creating an image of the scanned line segment.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
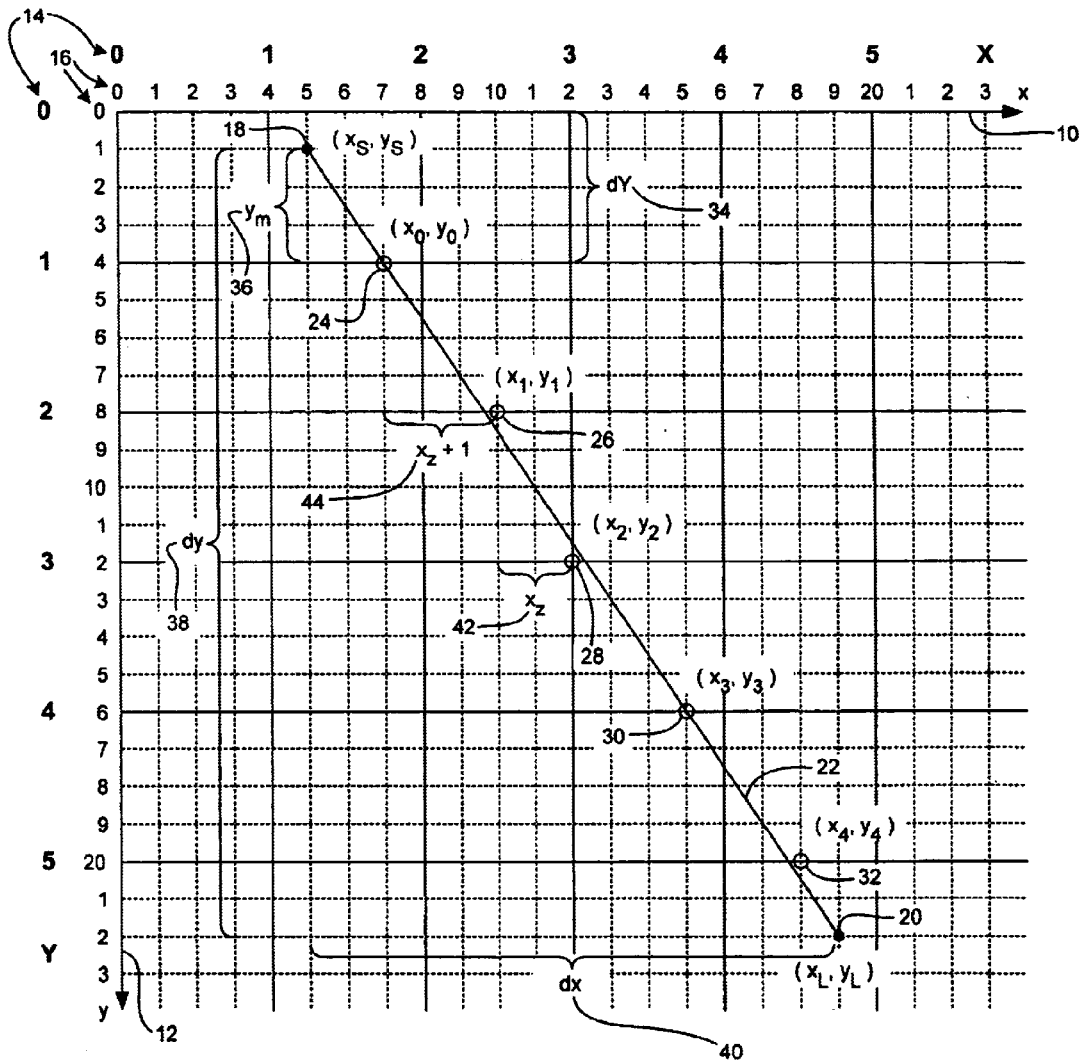
FIG. 1 is a graph illustrating an example of a scan-conversion of an ideal line according to one aspect of the present invention.

With reference to FIG. 1 there is shown a graph that illustrates an example of a scan-conversion of an ideal line according to one aspect of the present invention. The graph includes an X-axis 10, a Y-axis 12, a coarse grid coordinate system 14, generally, a fine grid coordinate system 16, generally, a first vertex 18, a second vertex 20, a line 22, a first point 24, a second point 26, a third point 28, a fourth point 30, and a fifth point 32.

The two vertices 18, 20 define an ideal line 22 connecting the two vertices. The first through the fifth points, 24–32, respectively, represent a best-fit approximation to the ideal line 22 produced by a line scan-conversion procedure according to one aspect of the present invention. The points 24–32 define points relative to the fine grid coordinate system 16.

The line scan-conversion procedure solves the following problem: given the first and second vertices 18, 20, return points, relative to the fine grid in the X-direction and relative to the coarse grid in the Y-direction, that lie closest to an imaginary ideal line 22 connecting the two vertices 18, 20. The line scan-conversion result is the set of points 24–32 that satisfy those criteria.

Though the points lie upon coarse grid coordinates in the Y-direction, both the X-value and the Y-value for each of the points 24–32 are expressed in terms of the fine grid system. Thus the first point 24 is (7, 4), not (7, 1). The procedure increments the value of Y by an amount dY (34 of FIG. 1), which in the example shown in FIG. 1 is 4, since each unit of the coarse grid is shown divided into four units of the fine grid. In general, the fine grid divides the coarse grid by any positive integer. However, in preferred embodiments, the fine grid divides the coarse grid by a positive integer power of 2, such as 1, 2, 4, and 8, etc. In the specific example illustrated in FIG. 1, dY=4, dY being the number of fine grid units per coarse grid unit. In a preferred embodiment, dY=16. The value of dY has been selected as 4 in the example shown in FIG. 1 because that value permits a simpler illustration.

Other parameters illustrated in FIG. 1 include an offset $y_m$ 36 corresponding to the number of fine grid units the Y-component of the first vertex 18 is offset from the Y-component of the first point 24. A parameter dy 38 corresponds to the difference between the Y-component of the second vertex 20 and the Y-component of the first vertex 18, $dy=y_L-y_S$. A parameter dx 40 corresponds to the absolute value of the difference between the X-component of the second vertex 20 and the X-component of the first vertex 18, $dx=|x_L-x_S|$. A parameter $x_Z$ 42 corresponds to a nominal (i.e., uncorrected) increment in an X-component. A corrected increment 44, $x_Z+1$, is also shown.

The line scan-conversion procedure that produces the points 24–32 computes a 'best-fit' function that is used to select either the uncorrected increment 42 or the corrected increment 44 to increment the previous X-value. The 'best-fit' function test insures that the resulting incremented X-value provides a fine grid integer X-value lying closest to the imaginary line 22 where the line 22 crosses the corresponding coarse grid Y-value.

Figure 2:
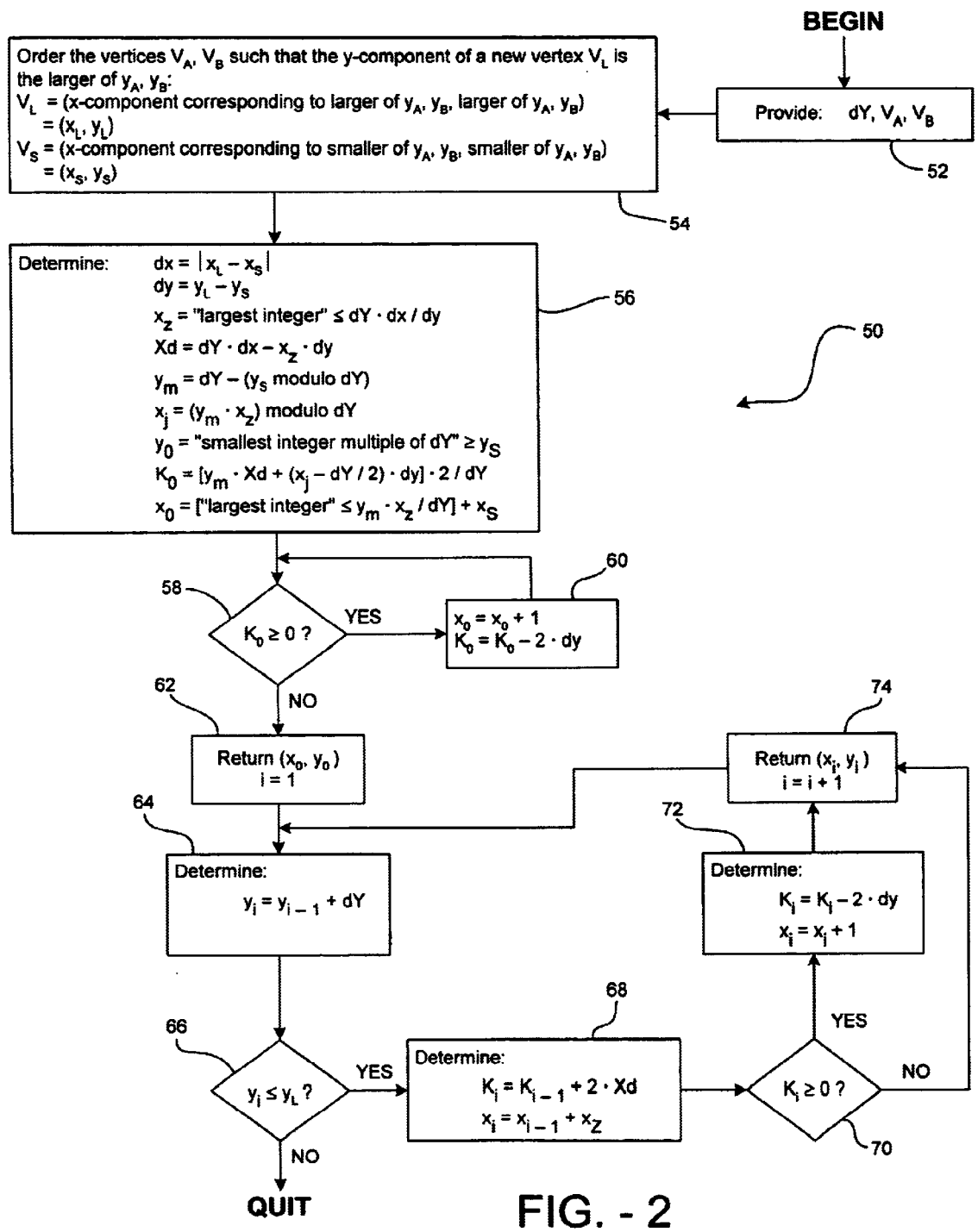
FIG. 2 is a flow diagram that illustrates a method for scan-converting a line according to another aspect of the present invention.

FIG. 2 is a flow diagram that illustrates a preferred method for scan-converting a line having arbitrary real-valued endpoint coordinates according to another aspect of the present invention. The method is designated generally by the reference numeral 50, and includes method steps 52–74.

The method begins at step 52 with values supplied for a parameter dY, and for vertices $V_A$, and $V_B$, where $V_A=(X_A, Y_A)$ and $V_B=(X_B, Y_B)$.

At step 54 two new vertices, $V_S=(x_S, y_S)$ and $V_B=(x_L, y_L)$, are defined such that the Y-component for $V_L$ is the larger of the Y-component for $V_A$, $V_B$, and the Y-component for $V_S$ is the smaller of the Y-component for $V_A$, $V_B$, thus ordering the two vertices $V_A$, $V_B$.

Next, at step 56 the method determines values for the following fixed parameters (note: each equation and assignment statement is numbered consecutively at the left, for convenience):

$$dx=|x_L-x_S| \quad (1)$$

$$dy=y_L-y_S \quad (1)$$

$$x_Z=\text{"largest integer"}\leq dY \cdot dx/dy \quad (3)$$

$$Xd=dY \cdot dx-x_Z \cdot dy \quad (4)$$

$$y_m=dY-(y_S \text{ modulo } dY) \quad (5)$$

$$x_f=(y_m \cdot x_Z) \text{ modulo } dY \quad (6)$$

$$y_0=\text{"smallest integer multiple of } dY\text{"}\geq y_S, \quad (7)$$

and determines initial values for the parameters:

$$K_0=[y_m \cdot Xd+(x_f-dY/2) \cdot dy] \cdot 2/dY. \quad (8)$$

$$x_0=[\text{"largest integer"}\leq y_m \cdot x_Z/dY]+x_S \quad (9)$$

The phrase "smallest integer multiple of dY" is to be interpreted as follows: assume $y_S$ is 6 and dY is 4, then the integer multiples of dY are 4, 8, 12, 16 . . . The smallest integer multiple of dY that is greater than or equal to $y_S$ is 8; for this example, $y_0=8$.

The function $K_0$ is a 'best-fit' function, the sign of which is examined to determine whether it is necessary to use an uncorrected value for an X-component, or to correct the value by incrementing the uncorrected value by 1. At steps 58, 60 the value of $K_0$ is iteratively adjusted until $K_0$ becomes negative. Each time the value of $K_0$ is adjusted, the value of $x_0$ is incremented by 1. Once the value of $K_0$ becomes negative, the final values for $K_0$ and $x_0$ have been determined and the method continues from step 62.

At step 58 a test of the sign of $K_0$ is made:

$$K_0\geq 0? \quad (10)$$

When $K_0$ is negative, no adjustment of $K_0$ is needed, and the method continues from step 62. When $K_0$ is positive or zero, an adjustment of $K_0$ is required, and the method continues from step 60. Under this iterative procedure, $K_0$ will eventually become negative.

An adjustment of $K_0$ and a corresponding incrementing of $x_0$ occur at step 60:

$$x_0=x_0+1 \quad (11)$$

$$K_0=K_0-2 \cdot dy. \quad (12)$$

At step 62 the method returns an initial point $(x_0, y_0)$, and sets an iteration control variable i=1.

Continuing at step 64, the method has entered an iterative loop (steps 64–74) that will return all remaining line scan-converted points $(x_i, y_i)$ while continuing to examine the sign of the 'best-fit' function $K_i$ and to correct the values of $K_i$ and $x_i$ whenever $K_i$ becomes positive or zero.

At step 64 the method determines the value $y_i$ of the Y-component of a next point $(x_i, y_i)$:

$$y_i=y_{i-1}+dY. \quad (13)$$

The scan-conversion progresses along the Y-axis 12, taking on consecutive integer coarse grid values. The value of the parameter dY is equal to the number of elements of the fine grid 16 that make up each element of the coarse grid 14. In FIG. 1, dY=4, however, in general, dY is any positive, non-zero integer. As stated above, a preferred value for dY is 16.

At step 66 the value of $y_i$ is compared with the value of $y_L$, the Y-component of the end of the line toward which the scan-conversion process is advancing. When $y_i$ is greater than $y_L$, the scan-conversion has progressed beyond the end of the line being scanned, and the method is complete ("QUIT"). Otherwise, the iterative loop (steps 64–74) continues from step 68:

$$y_i\leq y_L. \quad (16)$$

At step 68, the method updates the previous values of $x_i$ and the 'best-fit' function $K_i$:

$$x_i = x_{i-1} + x_Z \quad (17)$$

$$K_i = K_{i-1} + 2 \cdot Xd \quad (18)$$

At step 70 the sign of the function $K_i$ is examined to determine whether to correct the values for $K_i$ and for $x_i$, the X-component of the current point. When $K_i$ is positive or zero ("YES"), a correction is necessary and the method continues from step 72. Otherwise ("NO"), the method advances to step 74 and the current point $(x_i, y_i)$ is returned.

When $K_i$ is positive or zero, $K_i$ and $x_i$ are corrected at step 72:

$$K_i = K_i - 2 \cdot dy \quad (19)$$

$$x_i = x_i + 1. \quad (20)$$

After any necessary correction, the method completes the iterative loop at step 74 where the current point $(x_i, y_i)$ is returned and the iteration control variable i is incremented. Iteration continues until the Y-component has been advanced beyond the end of the scan-converted line (22 of FIG. 1).

EXAMPLE

The line scan-conversion method illustrated in FIG. 2 will now be applied to the example shown in FIG. 1. The step numbers in the left-hand column correspond to the reference numerals used in FIG. 2. Consecutive numbering of each equation and assignment statement continues.

BEGIN

Step 52

$$dY = 4 \quad (21)$$

$$V_A = (19, 22) \quad (22)$$

$$V_B = (5, 1) \quad (23)$$

Step 54

$$V_L = (19, 22) \quad (24)$$

$$V_S = (5, 1) \quad (25)$$

Step 56

$$dx = |x_L - x_S| = |19 - 5| = 14 \quad (26)$$

$$dy = y_L - y_S = 22 - 1 = 21 \quad (27)$$

$$x_Z = \text{"largest integer"} \leq dY \cdot dx / dy = \text{"largest integer"} \leq 4 \cdot 14 / 21 = \text{"largest integer"} \leq 8/3 = 2 \quad (28)$$

$$Xd = dY \cdot dx - x_Z \cdot dy = 4 \cdot 14 - 2 \cdot 21 = 56 - 42 = 14 \quad (29)$$

$$y_m = dY - (y_S \text{ modulo } dY) = 4 - (1 \text{ modulo } 4) = 4 - 1 = 3 \quad (30)$$

$$x_j = (y_m \cdot x_Z) \text{ modulo } dY$$

$$= (3 \cdot 2) \text{ modulo } 4 = 6 \text{ modulo } 4 = 2 \quad (31)$$

$$y_0 = \text{"smallest integer multiple of } dY\text{"} \geq y_S$$

$$= \text{"smallest integer multiple of 4"} \geq 1$$

$$= 4 \quad (32)$$

$$K_0 = [y_m \cdot Xd + (x_j - dY/2) \cdot dy] \cdot 2 / dY$$

$$= [3 \cdot 14 + (2 - 4/2) \cdot 21] \cdot 2 / 4$$

$$= [42 + (0) \cdot 21] \cdot 2 / 4 = 84 / 4 = 21 \quad (33)$$

$$x_0 = [\text{"largest integer"} \leq y_m \cdot x_Z / dY] + x_S$$

$$= [\text{"largest integer"} \leq 3 \cdot 2 / 4] + 5$$

$$= [\text{"largest integer"} \leq 6 / 4] + 5$$

$$= 1 + 5 = 6 \quad (34)$$

Step 58(1)

$$K_0 \geq 0? \ 21 \geq 0? \ \text{YES} \quad (35)$$

Step 60(1)

$$x_0 = x_0 + 1$$

$$x_0 = 6 + 1 = 7 \quad (36)$$

$$K_0 = K_0 - 2 \cdot dy$$

$$= 21 - 2 \cdot 21 = -21 \quad (37)$$

Step 58(2)

$$K_0 \geq 0? \ -21 \geq 0? \ \text{NO} \quad (38)$$

Step 62

Return initial point $(x_0, y_0) = (7, 4)$ \quad (39)

Set iteration control variable $i = 1$ \quad (40)

Step 64(1)

$$y_1 = y_0 + dY = 4 + 4 = 8 \quad (41)$$

Step 66(1)

$$y_1 \leq y_L? \ 8 \leq 22? \ \text{YES} \quad (42)$$

Step 68(1)

$$K_1 = K_0 + 2 \cdot Xd = -21 + 2 \cdot 14 = -21 + 28 = 7 \quad (43)$$

$$x_1 = x_0 + x_Z = 7 + 2 = 9 \quad (44)$$

Step 70(1)

$$K_1 \geq 0 \ ? \ 7 \geq 0? \ \text{YES} \quad (45)$$

Step 72(1)

$$K_1 = K_1 - 2 \cdot dy = 7 - 2 \cdot 21 = 7 - 42 = -35 \quad (46)$$

$$x_1 = x_1 + 1 = 9 + 1 = 10 \quad (47)$$

Step 74(1)

Return next point $(x_1, y_1) = (10, 8)$ \quad (48)

Increment iteration control variable $i = i + 1 = 1 + 1 = 2$ \quad (49)

Step 64(2)

$$y_2 = y_1 + dY = 8 + 4 = 12 \quad (50)$$

Step 66(2)

$$y_2 \leq y_L? \ 12 \leq 22? \ \text{YES} \quad (51)$$

Step 68(2)

$$K_2 = K_1 + 2 \cdot Xd = -35 + 2 \cdot 14 = -35 + 28 = -7 \quad (52)$$

$$x_2 = x_1 + x_Z = 10 + 2 = 12 \quad (53)$$

Step 70(2)

$K_2 \geq 0?$ $-7 \geq 0?$ NO (54)

Step 74(2)

Return next point $(x_2, y_2) = (12, 12)$ (55)

Increment iteration control variable $i = i+1 = 2+1 = 3$ (56)

Step 64(3)

$y_3 = Y_2 + dY = 12 + 4 = 16$ (57)

Step 66(3)

$y_3 \leq y_L?$ 16 $\leq$ 22? YES (58)

Step 68(3)

$K_3 = K_2 + 2 \cdot Xd = -7 + 2 \cdot 14 = -7 + 28 = 21$ (59)

$x_3 = x_2 + x_Z = 12 + 2 = 14$ (60)

Step 70(3)

$K_3 \geq 0?$ 21 $\geq$ 0? YES (61)

Step 72(3)

$K_3 = K_3 - 2 \cdot dy = 21 - 2 \cdot 21 = 21 - 42 = -21$ (62)

$x_3 = x_3 + 1 = 14 + 1 = 15$ (63)

Step 74(3)

Return next point $(x_3, y_3) = (15, 16)$ (64)

Increment iteration control variable $i = i+1 = 3+1 = 4$ (65)

Step 64(4)

$y_4 = y_3 + dY = 16 + 4 = 20$ (66)

Step 66(4)

$y_4 \leq y_L?$ 20 $\leq$ 22? YES (67)

Step 68(4)

$K_4 = K_3 + 2 \cdot Xd = -21 + 2 \cdot 14 = -21 + 28 = 7$ (68)

$x_4 = x_3 + x_Z = 15 + 2 = 17$ (69)

Step 70(4)

$K_4 \geq 0?$ 7 $\geq$ 0? YES (70)

Step 72(4)

$K_4 = K_4 - 2 \cdot dy = 7 - 2 \cdot 21 = 7 - 42 = -35$ (71)

$x_4 = x_4 + 1 = 17 + 1 = 18$ (72)

Step 74(4)

Return next point $(x_4, y_4) = (18, 20)$ (73)

Increment iteration control variable $i = i+1 = 4+1 = 5$ (74)

Step 64(5)

$y_5 = y_4 + dY = 20 + 4 = 24$ (75)

Step 66(5)

$y_5 \leq y_L?$ 24 $\leq$ 22? NO (76)

QUIT

The input to the procedure is $V_A = (19, 22)$; $V_B = (5, 1)$; dY=4. The procedure returns points (7, 4), (10, 8), (12, 12), (15, 16), and (18, 20). In a specific embodiment, dY is provided by the procedure rather than as an input. In another specific embodiment, the results of the line scan-conversion are returned as an array.

Experiment has taught that the adjustment of the initial values for $x_0$ and $K_0$ that Is takes place during steps 58, 60 (FIG. 2) never requires more than 3 iterations to insure $K_0$ is negative. Experiment has also taught that the resulting points of the line scan-conversion are a 'best-fit' to the imaginary, ideal line connecting the two vertices $V_A$, $V_B$. The present method produces the same points as a floating-point Bresenham algorithm having an equal truncation error.

Advantages of the Improved Line Scan-Conversion Method

The improved line scan-conversion method uses simple integer arithmetic for add, subtract, multiply and divide. In contrast to some older line scan-conversion methods, there is no accumulated error over the length of a line. The improved method provides sub-pixel precision and generates points, on the average, much faster than current methods providing equal accuracy.

A Practical Use for the Improved Line Scan-Conversion Method

Figure 3:
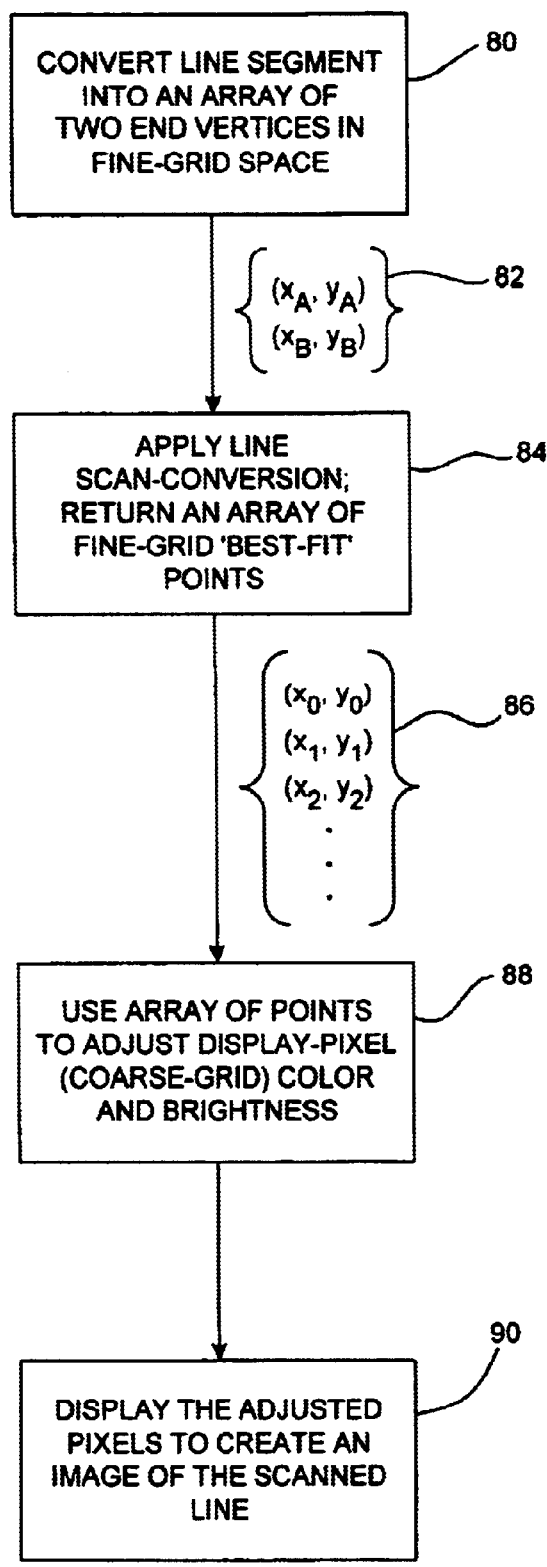
FIG. 3 is a flow diagram that illustrates a practical use of the improved line scan-conversion method of FIG. 2.

FIG. 3 is a flow diagram that illustrates a practical use for the improved line scan-conversion method shown in FIG. 2. The typical use includes three steps. A first step 80 converts a line segment into an array 82 having two members representing a pair of vertices defining the line segment in a fine-grid space. The two vertices, $V_A$, $V_B$ are defined as ($x_A$, $y_A$) and ($x_B$, $y_B$), respectively. A second step 84 applies a line scan-conversion as defined with respect to FIG. 2. Step 84 returns an array of points 86 in the fine-grid space. A third step 88 uses the array of points to adjust display-pixel color is and brightness attributes to create an image for output to a graphical output device, such as a computer monitor or graphic printer. A final step 90 outputs the created image to the output device for displaying the scanned line segment $V_A$, $V_B$.

In a specific embodiment, the coarse-grid corresponds to display-pixel size. The integer N is 16 so that the fine-grid subdivides the coarse-grid by 16. Thus each display-pixel is divided into a square 16 by 16, or 256 sub-pixels. The initial vertices $V_A$, $V_B$ are defined relative to the fine-grid. Thus each end of a line segment is located at one of 256 locations within a pixel. In this sense, the ends of the line segment are arbitrarily located within the accuracy (truncation error) of the integer N. Step 84 uses integer arithmetic only. When the Y-direction is vertical, and when display-pixel size corresponds to display scan line spacing in the vertical direction, step 84 produces points at scan line increments having 1/N precision in the horizontal, X-direction.

In another specific embodiment, the fine grid defines a sub-pixel space in which each pixel contains N×N sub-pixels. In yet another specific embodiment, a sub-pixel space defines an overlay on the pixel space, and shares orthogonal axes with the pixel space.

Known procedures for adjusting the color and brightness of adjacent pixels for creating an accurate visual image are employed at step 88. An example of such a procedure is found in Foley, supra, at page 884.

The use of sub-pixel precision makes it possible to display line segments having arbitrary endpoints without the use of floating point arithmetic. Incrementing at display-pixel increments in the vertical scan direction while defining points with sub-pixel precision in the horizontal direction both (1) reduces the computational burden, and (2) provides better visual quality.

Additional Uses for the Improved Line Scan-Conversion Method

The improved line scan-conversion method is also useful in any graphics application in which a process of linear interpolation is required, as for example in the processes of drawing polygons, shading and morphing. A specific example includes rasterizing a triange (see Foley, supra, at page 884). In this example the span extends in a horizontal direction from a starting point to an ending point. The goal is to determine some color attribute for each pixel along the span between the starting and ending points.

The improved line scan-conversion method according to another aspect of the present invention utilizes the coarse-grid Y-axis to correspond to the individual pixels along the span. The fine-grid X-axis corresponds to values of the specific color attribute being interpolated. The starting point of the span has a particular color attribute value, while the ending point of the span has a second particular value. The linear interpolation task is to compute intermediate color attribute values between the two ends of the span which represent a best color fit to the pixels used to display the span ultimately.

This task is comparable to the task of defining a set of points corresponding to actual display pixels to best represent a line. In the triangle rasterizing case, the method is used to find points along a color continuum that come closest to fitting the pixels involved. The method is still called a line scan-conversion method even though used to interpolate in a space in which one dimension is a color attribute and the other is displacement along a horizontal line.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A method for scan-converting a line segment in a pixel output space for adjusting attributes of display pixels in a graphics system, the method comprising the steps of:

defining a two-dimensional pixel output space having orthogonal X and Y axes, and each pixel of the output space having attributes of location, color and brightness;

providing a positive integer N;

defining a sub-pixel overlay on the pixel output space, the overlay sharing the X and Y axes, and each pixel containing N×N sub-pixels;

receiving a pair of vertices, $V_A = (x_A, y_A)$ and $V_B = (x_B, y_B)$, having integer coordinates, and defining a line segment relative to the sub-pixel overlay;

ordering the vertices such that $V_S = (x_S, y_S)$, $V_L = (x_L, y_L)$, where
   $y_L$ = the larger of $y_A$, $y_B$,
   $y_B$ = the smaller of $y_A$, $y_B$, and
   $x_L$ and $x_S$ are the X-components which correspond to $y_L$ and $y_S$, respectively;

determining integer values for the following fixed parameters,
   $dY = N$
   $dx = |x_L - x_S|$
   $dy = y_L - y_S$
   $x_Z$ = "largest integer" $\leq dY \cdot dx/dy$
   $Xd = dY \cdot dx - x_Z \cdot dy$
   $y_m = dY - (y_S \text{ modulo } dY)$
   $x_j = (y_m \cdot x_Z) \text{ modulo } dY$
   $y_O$ = "smallest integer multiple of dY" $\geq y_S$;

determining initial integer values for the parameters,
   $K_0 = [y_m \cdot Xd + (x_j - dY/2) \cdot dy] \cdot 2/dY$.
   $x_0 = [\text{"largest integer"} \leq y_m \cdot x_Z/dY] + x_S$;

testing the sign of $K_0$, and
   if $K_0$ is negative, returning the point $(x_0, y_0)$, and continuing from the setting an iteration control variable step,
   else, adjusting the integer values for $K_0$ and $x_0$ as follows,
   $K_0 = K_0 - 2 \cdot dy$
   $x_0 = x_0 + 1$,
   and continuing from the testing the sign of $K_0$ step;

setting an iteration control variable i=1;

determining an integer value for
   $y_i = y_{i-1} + dY$;

comparing $y_i$ with $y_L$, and
   if $y_i$ is less-than-or-equal-to $y_L$, determining integer values for $x_i$ and $K_i$ as follows,
   $x_i = x_{i-1} + x_Z$
   $K_i = K_{i-1} + 2 \cdot Xd$, then
   testing the sign of $K_i$, and
   if $K_i$ is positive or zero,
   correcting the integer values of $x_i$ and $K_i$, as follows,
   $x_i = x_i + 1$
   $K_i = K_i - 2 \cdot dy$, then
   returning the point $(x_i, y_i)$,
   using $y_i$ to select a row location of display pixels in the graphics system,
   using $x_i$ to select two pixels of the selected row location that are closest to the line segment,
   adjusting display attributes of the two pixels,
   updating the value of the iteration control variable i, as follows,
   i=i+1, and
   continuing from the determining a value for $y_i$ step, else, quitting the procedure.

2. The line scan-converting method as set forth in claim 1, wherein the pixels have attributes of color and brightness, and further including the steps of providing means for adjusting said pixel attributes, and using the returned points to adjust the color and the brightness of the pixels according to a known procedure.

3. The line scan-converting method as set forth in claim 2, further including the steps of providing a graphical output device for displaying the pixels, and displaying the pixels on the graphical output device.

4. The line scan-converting method as set forth in claim 3, further including the Y-axis corresponding to a vertical scan axis of the graphical output device.

5. The line scan-converting method as set forth in claim 1, wherein the value of the integer N is a positive power of 2.

6. The line scan-converting method as set forth in claim 4, wherein the graphical output device is a color display monitor.

* * * * *

UNITED STATES PATENT AND TRADEMARK OFFICE
CERTIFICATE OF CORRECTION

PATENT NO. : 6,734,870 B1
DATED : May 11, 2004
INVENTOR(S) : D. David Kuo

It is certified that error appears in the above-identified patent and that said Letters Patent is hereby corrected as shown below:

Column 2,
Line 22, delete "[only]" between "using" and "integer".

Column 3,
Line 9, numeral "4" should not be bold.
Lines 46-47, replace "$X_A$, $Y_A$" with -- $x_A$, $y_A$, -- and replace "$X_B$, $Y_B$" with -- $x_B$, $y_B$. --
Line 54, "left" should be changed to -- right -- because the sequential equation numbers have been moved from the left-side of each equation to the right-side.
Line 61 approximately, replace second equation number "(1)" with corrected equation number (2) --.
Equation (4) replace "xz" with -- $x_z$ --.

Column 5,
Equation (29) replace "xz" with -- $x_z$ --.

Column 7,
Equation (57) replace "$Y_2$" with -- $y_2$ --.

Column 8,
Line 9, delete "Is" between "that" and "takes".

Column 9,
Line 56, replace "yA" with -- $Y_A$ --.

Column 10,
Line 10, remove stray period at end of line.

Signed and Sealed this

Fourteenth Day of September, 2004

JON W. DUDAS
*Director of the United States Patent and Trademark Office*